United States Patent [19]

Seymour

[11] 4,057,897
[45] Nov. 15, 1977

[54] PORTABLE HYDRAULIC TOOL USEFUL FOR CUTTING NUTS

[76] Inventor: Charles Mitchell Seymour, 1581 Oak Road, Simi, Calif. 93606

[21] Appl. No.: 677,971

[22] Filed: Apr. 19, 1976

[51] Int. Cl.$^2$ .............................................. B26B 7/00
[52] U.S. Cl. .................................. 30/272 R; 30/180; 30/182; 30/228; 30/241
[58] Field of Search ................. 30/180, 182, 241, 228, 30/272 R

[56] References Cited

U.S. PATENT DOCUMENTS

| | | | |
|---|---|---|---|
| 2,257,245 | 9/1941 | Rudolph | 30/241 X |
| 2,714,250 | 8/1955 | Twedt | 30/180 |
| 2,823,454 | 2/1958 | Kirchner | 30/228 |
| 2,994,955 | 8/1961 | Dowley | 30/182 X |
| 3,058,214 | 10/1962 | Mekler | 30/180 |
| 3,093,024 | 6/1963 | Pell | 30/182 X |
| 3,811,348 | 5/1974 | Brown | 30/180 UX |
| 3,906,628 | 9/1975 | Hastings | 30/182 |

Primary Examiner—Gary L. Smith
Assistant Examiner—J. T. Zatarga
Attorney, Agent, or Firm—Poms, Smith, Lande & Glenny

[57] ABSTRACT

A portable device for cutting and removing nuts, has two hydraulic assemblies connected by a high pressure, flexible hydraulic line. At one end of the line is a light hand-powered hydraulic pump, effective at any orientation. Attached to the other end of the line is a compact hydraulically actuated head unit. Recessed into the unit is a curved moveable jaw, opposite which and also recessed is a cutting blade. Enough room is provided between the cutting blade and the jaw for a nut to fit snugly. Pressure from the pump drives the piston towards the cutting blade, and cuts the nut, permitting its easy removal.

4 Claims, 5 Drawing Figures

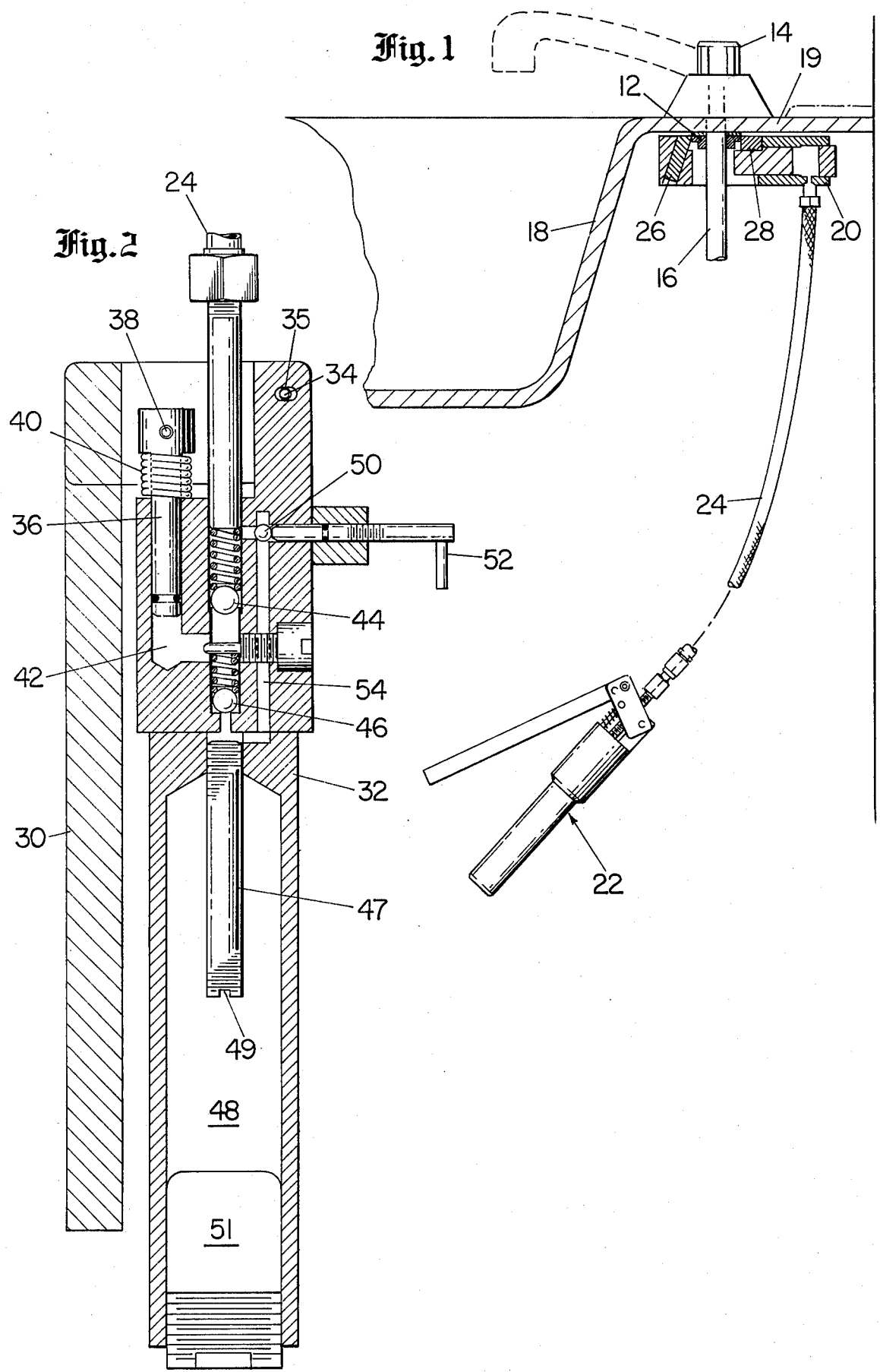

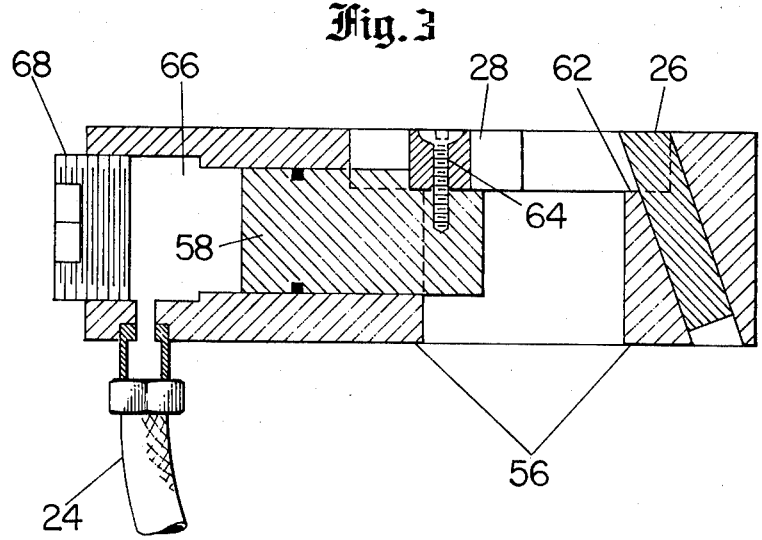
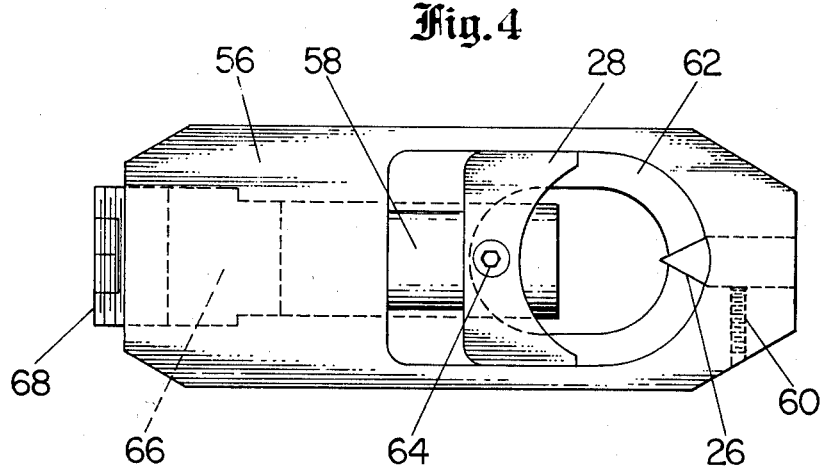
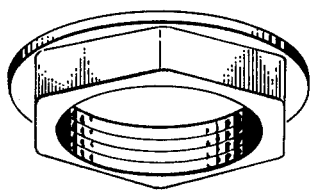

PORTABLE HYDRAULIC TOOL USEFUL FOR CUTTING NUTS

BACKGROUND OF THE INVENTION

This invention relates to portable hydraulic tools. This tool in the disclosed form was developed to meet a long standing need in the plumbing trade. Prior to this invention, the removal of basin nuts rusted, corroded, or otherwise stuck in place under and behind sinks, has been a very difficult problem. Plumbers have often struggled with these nuts that secure faucets onto sinks (or basins), trying everything from the traditional basin wrench to hacksaws and power drills. This time consuming, frustrating work can easily occupy a plumber for a full hour or more. Problems with using power drills to cut the basin nuts included grounding the drill through the wet plumbing, with the attendant shock hazard, and dangers from soft metal chips flying down into the plumber's eyes. It is a specific aim of this invention to introduce a portable tool capable of removing these frozen nuts in a matter of minutes without the problems noted above.

SUMMARY OF THE INVENTION

The preferred embodiment of the present invention solves the foregoing problem of removing frozen basin nuts, by using a remotely located, hand-powered hydraulic pump connected by flexible hydraulic line to a nut cutting unit. Through the use of this apparatus the inventor has been able to provide sufficient force to cut basin nuts in otherwise inaccessible areas.

The cutting unit or head basically contains two members, a piston, fitted with a curved piece of metal of "jaw" designed to fit one side of a basin nut and a hardened steel cutting blade diametrically opposed to and slanted toward the piston. The nut to be removed fits snugly between cutting blade and curved face or jaw, and is held against lateral movement by the recessed portion of the main body of the head.

Pressure in the cylinder holding the piston forces the piston, and thus the nut to be removed, toward the cutting blade. The force is more than enough to cut and remove the basin nuts encountered by plumbers thanks to the mechanical advantage offered by the pump.

In accordance with one collateral aspect of the invention, a portable tool includes a working unit having a hydraulic piston for moving one working member relative to another; and a flexible high pressure line connecting the working unit to a manually operated pump which is arranged to operate in any orientation. Preferably, in the manual pump, hydraulic fluid is drawn from the hydraulic fluid reservoir away from the walls of the reservoir so air is not drawn into the hydraulic system.

Other objects, features and advantages of the invention will become apparent from a consideration of the following detailed description and from the drawings, in which:

FIG. 1 shows the tool being used to cut a basin nut;
FIG. 2 is a cross sectional view of the hydraulic pump;
FIG. 3 is a cross sectional view of the head unit;
FIG. 4 is a top view of the head unit; and
FIG. 5 shows a basin nut.

DETAILED DESCRIPTION

Referring more particularly to the drawings, it will be seen that FIG. 1 shows the tool in the process of cutting a basin nut 12. The basin nut 12 secures the faucet 14, and its threaded input pipe 16, in position at the rear of the basin or sink 18. This location is, as shown in the drawing, quite inaccessible and it is very difficult to remove corroded basin nuts from such locations.

The basin nut removal tool includes the working head 20, and the manually operated pump 22 interconnected by the flexible, high pressure hydraulic line 24. In operation, the head 20 is slid over the pipe 16 and around the basin nut 12, with the cutting blade 26 and the opposing jaw 28 located on two opposite sides of the basin nut 12. The pump 22 is then manually actuated to force jaw 28, of head 20, forward so that the basin nut is engaged by the cutting blade 26, and is severed. If necessary, the head is then rotated by 180° and the basin nut 12, is cut a second time so that it may be more easily removed.

Incidentally, in the showing of FIG. 1, the rearwardly extending horizontal portion 19 of the sink is shown as having a greater extent than is normally found in plumbing installations, for ease in illustration of the manner of operation of the working head 20. In practice, there is usually very little space between the basin and the wall, and the working head 20 must be oriented parallel to the wall rather than perpendicular to the wall as shown in FIG. 1.

The structural design of the pump 22, will now be considered in greater detail by reference to FIG. 2. In FIG. 2 the handle 30 is connected to main body of the pump 32 at pivot pin 34. The piston 36 is connected to the handle 30, through pivot point 38. To permit linear movement of piston 36, the hole 35 is enlarged as shown to permit slight movement of the pivot point.

In the position shown, spring 40 is in its compressed state. When handle 30 is released, spring 40 pulls piston 36 partially out of cylinder 42. Valves 44 and 46 are arranged to permit the withdrawing of hydraulic fluid from reservoir 48 and the application of high pressure by piston 36 to hydraulic line 24. When the spring 40 moves piston 36 to the withdrawn state, valve 44 closes, and valve 46 opens allowing hydraulic fluid to be drawn from reservoir 48 into chamber 42. While drawing hydraulic fluid from reservoir 48, spring 40 is raising the handle 30, to its rest position as shown in FIG. 1 at 22.

In operation, the handle 30 is manually actuated toward the body of the pump, pushing piston 36 back into cylinder 42. When the pressure in cylinder 42 increases, valve 46 closes and valve 44 opens, allowing the oil under high pressure to be forced into hydraulic line 24. When piston 36 has entered cylinder 42 as far as possible, handle 30 is released and valve 44 closes while valve 46 opens, allowing more oil to be drawn into cylinder 42 as the handle 30 returns to its rest position. This operation is then repeated until the desired work is done.

In FIG. 2, hydraulic fluid is withdrawn from reservoir 48 through a short section of hollow tubing 47. The end 49 of tubing 47 opens toward the center of hydraulic fluid reservoir 48, so that air which is also contained within reservoir 48 is not drawn into the high pressure hydraulic system. To give an indication of the approximate amount of air in the system, an air bubble 51 is shown at the end of chamber 48. Of course, the position of the air bubble would shift depending on the orientation of the pump, but would follow the walls of reservoir 48 and would never reach the high pressure inlet 49 at the end of tubing 47.

After cutting the nut, the release valve 50 is opened by turning the release valve bolt 52. Hydraulic fluid may then return to reservoir 48, by way of bypass channel 54.

The structural design of the head unit will now be considered in further detail by reference to FIGS. 3 and 4. The cross-sectional view of FIG. 3 shows that the cutting blade 26 is located in the main body of the head 56 by insertion into a precisely drilled hole angled toward the piston 58. As shown in FIG. 4, cutting blade 26 is held in position pointing toward piston 58 by set screw 60.

The top front portion of cylindrical piston 58 has been cut away to match recessed ledge 62 of main body 56 and to accomodate curved jaw 28. The curved jaw 28 is fastened to piston 58 by machine screw 64. The cylindrical chamber 66, is sealed at one end by nut 68. The piston 58 moves in and out of the other end of the chamber 66 under control of the hydraulic fluid pressure. As noted above, the hydraulic line 24 connects chamber 66 with the hand pump, shown in FIG. 2.

In operation, the head unit shown in FIGS. 3 and 4 is placed so that the basin nut (see FIG. 5) to be cut is located between the curved jaw 28 and the cutting blade 26. While the head unit is held in place, the hand pump is actuated, providing pressure through hydraulic line 24 to chamber 66. The pressure pushes piston 58 and thus jaw 28 toward cutting blade 26. With continued actuation of the pump, the piston 58 and thus jaw 28 slowly force the basin nut against the cutting blade, thus cutting the nut on one side. In many cases this first cut is sufficient to remove the nut as the other side of the nut will crack by itself due to the forces set up by the first cut. Should this first cut not be enough to remove the nut, the head unit will then be rotated by 180° and the same procedure repeated, to complete the nut removal.

As mentioned above, FIG. 5 is an isometric view of a typical basin nut employed to secure faucets in place on sinks.

In summary, the present tool has reduced the time needed by a plumber to remove basin nuts from approximately one hour to about five minutes. While other cutting tools have been proposed (see U.S. Pat. Nos. 1,361,798, inventor Peterson; 2,776,481, inventor Northcutt; 3,093,024, inventor Pell; and 3,733,699, inventor Bock), they are not suitable or applicable to problems such as that solved by the presently disclosed arrangements. More specifically, the inventor not only recognized the problem but developed the unique solution involving a compact head and a flexible hydraulic line to permit action in the restricted space.

What is claimed is:

1. A portable hydraulic tool for cutting and removing basin nuts securing faucets to a flat surface of a sink where the basin nuts are secured onto the threaded portions of the faucet assembly which extend through holes and protrude down to the rear of and underneath the sink in very cramped quarters, comprising:

a compact hydraulic working unit including a frame body member having a flat surface, and an opening of generally oval configuration extending from said flat surface for receiving the threaded pipe, said opening having an additional recess extending from said flat surface around the major portion of said opening for accommodating said basin nut while the balance of said opening is of a lesser cross-sectional size to centrally locate said pipe without the need for visually observing the relative position of said working unit relative to the basin nut and pipe;

a hydraulic cylinder in said body unit;

a piston having one end mounted in said cylinder and the other end extending into said opening for engaging said pipe;

means including a jaw having a curved configuration lying substantially flush with the flat recessed side of said frame member and movable in said recess for engaging one side of the basin nut, the center of the curved portion of said jaw being secured to said piston and spaced back from the face of said piston so that the point of engagement of the front face of said piston is significantly forward from the point of engagement of the center of the jaw;

means including a cutting blade for cutting the side of the basin nut opposite to said jaw and said piston, said cutting blade extending into said recess to a point substantially in the plane of the flat side of said unit; and means including a remotely located hand-powered hydraulic pump and a flexible high pressure hydraulic line for supplying hydraulic fluid under high pressure to said hydraulic cylinder and for forcing said piston and jaw forward relative to said body member so that the basin nut is engaged and severed by said cutting blade.

2. A portable hydraulic tool as defined in claim 1 wherein said working unit extends in one direction only a sufficient distance to accommodate the required length of said piston and in the other direction only a sufficient distance to accommodate the cutting blade support, and wherein the hydraulic connection to said working unit is from the side away from said flat recessed side.

3. A portable hydraulic tool as defined in claim 1 wherein said cutting blade is a hardened blade angled toward the center of said curved jaw.

4. A portable hydraulic tool as defined in claim 1 wherein means are provided for stopping the piston in its fully advanced position, prior to loss of hydraulic fluid, said means including the ends of said curved jaw, and the remote sides of said recess which are contacted when the piston is fully extended.

* * * * *